Wm Bott & Peter Bott.
Impd. Grain Shaker.
PATENTED JUL 18 1871
117040
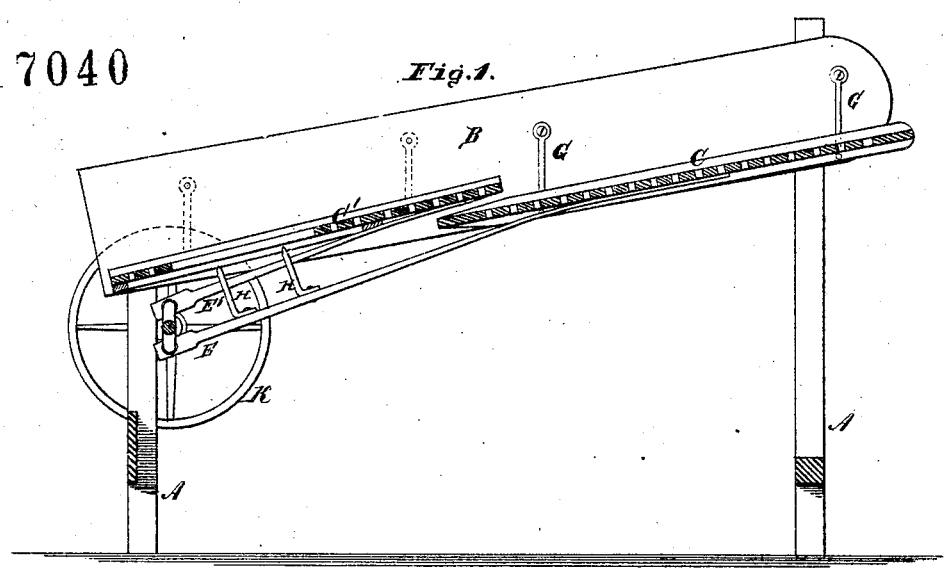
Fig.1.
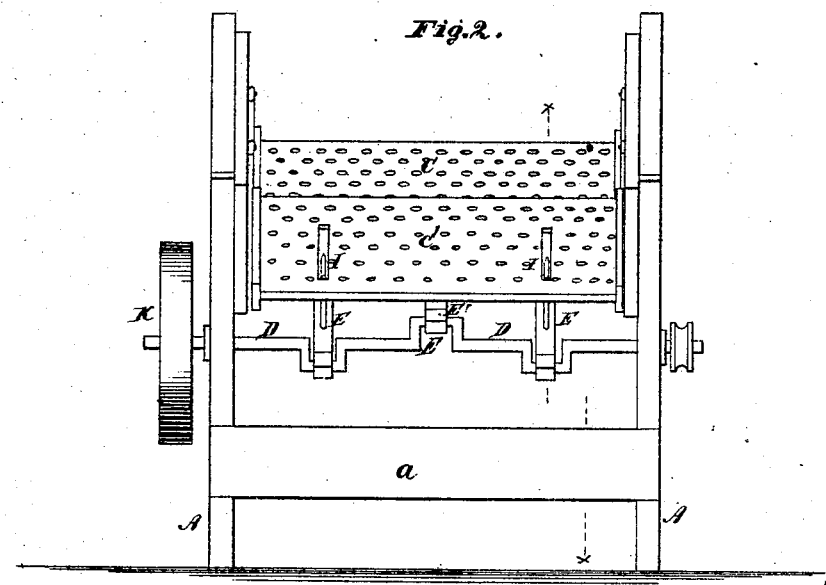
Fig.2.
Fig.3.
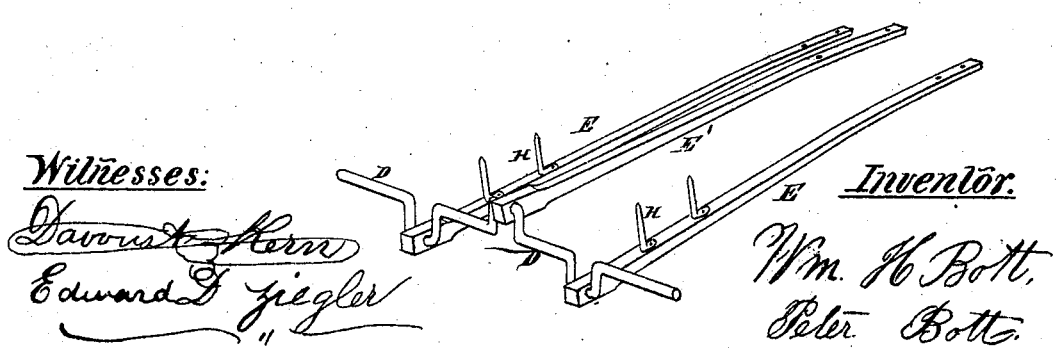
Witnesses:
Davoust Kern
Edward F Ziegler
Inventor:
Wm. H. Bott,
Peter Bott.

UNITED STATES PATENT OFFICE.

WILLIAM H. BOTT AND PETER BOTT, OF WEST MANCHESTER TOWNSHIP, PA.

IMPROVEMENT IN GRAIN-AND-STRAW SHAKERS.

Specification forming part of Letters Patent No. 117,040, dated July 18, 1871.

*To all whom it may concern:*

Be it known that we, WILLIAM H. BOTT and PETER BOTT, of West Manchester township, in the county of York and State of Pennsylvania, have invented a certain new and useful Improvement in Grain-Shakers attached to Thrashing-Machines; and we do hereby declare the following to be a full, clear, and exact description thereof, reference being had to the accompanying drawing forming part of the same, and in which—

Figure 1 represents a sectional side view; Fig. 2 exhibits an end view thereof, and Fig. 3 shows a perspective view of our invention.

This invention relates to grain-shakers attached to thrashing-machines; and consists of the following devices: Four upright standards and three cross-bars; a double-perforated bottom; two upright sides; eight hinges; a double crank, to the end of which is attached a large wheel; three rods connecting the perforated bottoms with the double crank; and iron prongs or teeth passing through elongated openings in one of the perforated bottoms. By means of these devices, when in operation, the grain is separated from the straw by falling through the perforated bottoms, and the straw, as it comes from the cylinder of the thrashing-machine, is immediately carried away by means of the prongs attached to the connecting-rods and passing through the elongated apertures in the perforated bottom.

Similar letters of reference in the several figures indicate corresponding parts of our invention.

To enable those skilled in the art for which our invention is adapted to make and use the same, we now proceed to fully describe its construction and operation, which are as follows:

In the accompanying drawing, A represents the upright standards, held firmly by the cross-bars $a$, only one of which can be seen in the drawing. B shows the sides, and attached to these are the suspension-rods G, supporting the perforated bottoms C C, for the purpose of allowing to them forward and backward motion. E E E' are agitating-bars or rods connecting the double crank D with the bottoms C C'. The perforated bottoms form an inclined plane at an elevation of about thirty degrees, thus separating the grain more thoroughly from the straw than if it were a horizontal plane. It will be seen that when motion is applied to the large wheel K, which is rigidly attached to the end of the double crank D, said crank is revolved, and this, with the connecting agitator-bars E E E', imparts simultaneously forward and backward movements to the perforated bottoms C C'; and the prongs H H, passing through the elongated slots I I, move the straw forward, thus preventing its accumulation at and clogging of the cylinder of the thrashing-machine.

Having fully described our invention, what we claim as new, and desire to secure by Letters Patent, is—

In combination with the perforated reciprocating bottom C' having elongated slots I and the double-throw crank D, the agitating-rods E when provided with the prongs H, substantially as and for the purpose described.

WM. H. BOTT. [L. S.]
PETER BOTT. [L. S.]

Witnesses:
FRANK GEISE,
JNO. A. METZELL.